United States Patent
Laumen et al.

(10) Patent No.: US 7,436,823 B2
(45) Date of Patent: Oct. 14, 2008

(54) METHOD FOR TRANSMITTING DATA

(75) Inventors: Josef Laumen, Hildesheim (DE); Ralf Prenzel, Salzgitter (DE); Andreas Schmidt, Braunschweig (DE); Markus Trauberg, Velchede (DE); Sabine Van Niekerk, Salzgitter (DE)

(73) Assignee: Siemens Aktiengesellschaft, Munich (DE)

( * ) Notice: Subject to any disclaimer, the term of this patent is extended or adjusted under 35 U.S.C. 154(b) by 936 days.

(21) Appl. No.: 10/485,532

(22) PCT Filed: Aug. 1, 2002

(86) PCT No.: PCT/DE02/02842

§ 371 (c)(1),
(2), (4) Date: Feb. 2, 2004

(87) PCT Pub. No.: WO03/015368

PCT Pub. Date: Feb. 20, 2003

(65) Prior Publication Data

US 2004/0170161 A1  Sep. 2, 2004

(30) Foreign Application Priority Data

Aug. 2, 2001 (DE) .............................. 101 37 866

(51) Int. Cl.
*H04L 12/66* (2006.01)
*H04M 1/00* (2006.01)

(52) U.S. Cl. .............. 370/356; 370/349; 370/401; 455/556.1

(58) Field of Classification Search .......... 370/352, 370/353, 354, 355, 356, 349, 401; 455/556.1, 455/556.2, 557
See application file for complete search history.

(56) References Cited

FOREIGN PATENT DOCUMENTS

| DE | 3901353 A1 * | 7/1990 |
|----|--------------|--------|
| DE | 39 01 353 | 7/1999 |
| WO | WO 01/33803 | 5/2001 |
| WO | WO 91/33803 | 5/2001 |
| WO | WO 01/39577 | 6/2001 |

OTHER PUBLICATIONS

Database WWW.ETSI.ORG 'Online! Version 4.3.0 Release 4, Jun. 2001 XP-002225945.

* cited by examiner

*Primary Examiner*—Melur Ramakrishnaiah

(57) ABSTRACT

A method is provided for mobile transmission of data, especially a method for transmitting multimedia data to a mobile subscriber terminal, wherein the data MM from an MMS application is transmitted to a network unit MMS Proxy/Relay A, the data is re-transmitted to a network unit MMS Proxy/Relay B via a link to a network unit, whereupon it is sent to a recipient, the conversion of the data occurring in a network unit MMS Proxy/Relay between a binary and a textual representation. Elements of data containing an unknown codeword are transmitted in a marked manner in order to provide a method for mobile transmission of multimedia data, a computer program product and a computer program system wherein unknown codes also can be processed without system-related transmission problems, particularly in a forward-compatible manner.

9 Claims, 1 Drawing Sheet

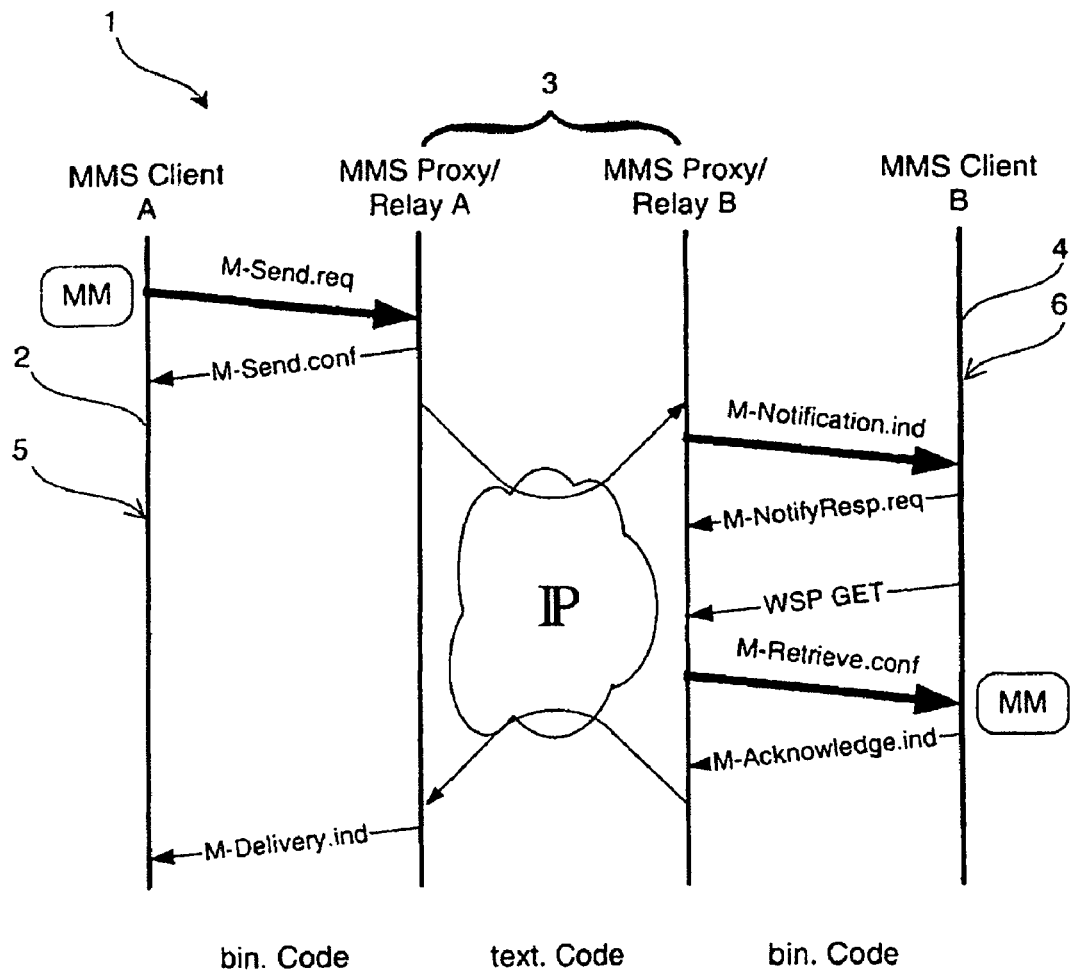
Figure

METHOD FOR TRANSMITTING DATA

BACKGROUND OF THE INVENTION

The present invention relates to a method for mobile data transmission, particularly a method for transmitting multimedia data to a mobile subscriber terminal, as well as to a computer program product and a communication system.

Methods and apparatuses for mobile transmission of various forms or formats of data are known. In this context, the concept of data within the scope of the present invention is also understood to include any kind of information which is made up of individual components. In this case, these individual components or elements may be constructed, organized and/or coded according to different standards. Accordingly, data in this context also may be a multimedia message including various elements from different standards. The concept of mobile transmission is subsequently understood to include transmission which also permits transmission of data from and/or to at least one mobile subscriber.

A mobile radio system based on the Global System for Mobile Communications standard, GSM for short, affords not only voice telephony, for example, but also the opportunity to send and receive information in the form of short text messages of up to 160 characters in length. This service is called the Short Message Service, SMS for short.

For the next generation of mobile radio system, the Universal Mobile Telecommunication System UMTS, a multimedia-compatible variant of a mobile message service is currently being standardized, the "Multimedia Messaging Service" MMS see 3GPP TS 23.140 Version 4.1.0, Release 4; 3rd Generation Partnership Project; Technical Specification Group Terminals; Multimedia Messaging Service (MMS); Functional Description; Stage 2 and 3GPP TS 22.140 v.4.0.1 (July 2000), 3rd Generation Partnership Project; Technical Specification Group Services and System Aspects; Service Aspects; Stage 1 Multimedia Messaging Service.

Subsequently, information in the form of messages with multimedia contents is simply called multimedia message, MM for short, to provide a better distinction from the text messages of the SMS. In contrast to the SMS, the Multimedia Message Service MMS is not limited to pure text contents. In an MMS, it also will be possible to format texts according to individual taste and to embed any desired contents into a message. These include, by way of example, audio and video contents, still pictures, graphics, texts, inter alia. The revelations disclosed below make general reference to volumes of data which are made up of individual elements of text and/or image data with or without sound and are respectively coded according to the same or different standards, even if a fundamental field of use for the present invention can be seen in applications based on the aforementioned standard.

On the basis of the prior art to date, MMS can be implemented merely using the Wireless Application Protocol WAP. To breach the air interface between an MMS-compatible terminal and the WAP gateway, provision is made for the WAP Wireless Session Protocol WSP to be used, see WAP-209-MMS Encapsulation, Wireless Application Protocol; WAP Multimedia Messaging Service; Message Encapsulation; MMS Approved version, June 2001 and 3GPP TS 23.140 version 4.3.0, Release 4, June 2001; 3rd Generation Partnership Project; Technical Specification Group Terminals; Multimedia Messaging Service (MMS); Functional Description; Stage 2. An MM usually includes a number of parts with a content which is freely definable within broad limits and can be made up of various formats. In this case, an MM basically includes a header part and a data part. The header part or header is made up of defined header fields and contains general information relating to the MM. The data part of an MM may contain one or more elements of different data types and data formats in any order.

For the purpose of transmission, a sender and a desired receiver are connected to one another via a network structure, with the subscriber terminals respectively being connected to a sender-end and a receiver-end network unit via air interfaces. The network units themselves, however, are connected to one another via a landline network, which is organized on the basis of an Internet protocol, for the purpose of data transmission. The change from transmission via an air interface with binary coding to a landline network connection with textual coding necessitates a recoding operation. In this context, particular importance is attached to recoding the header fields. These act as control elements for the data organization within an MM and need to be of e-mail-like design for the purpose of structure alignment with the IP network. Without knowledge of the header fields, an appended data portion no longer can be processed.

As already known from the EDP sector, new data formats are almost constantly appearing whose designation, recognition and/or processing and recoding necessitate continual renewal or updating of the system. Since, in the near future, even more different types of subscriber terminals will, at least in some cases, communicate with one another via mobile radio networks, a large number of very different new codings and identifications can be expected. In the case of a method for mobile data transmission and a corresponding communication system, such continual renewal is becoming almost impossible to carry out, inter alia on account of the large number of network units.

On the basis of the prior art, a binary coding for the header fields is stipulated for the MMS specifically in the specification WAP 209—MMS Encapsulation, Approved version; i.e., explicitly a binary coding for the header field names, header field values and any parameters. The type of coding is based on the coding defined in the "Wireless Session Protocol", WSP, WAP-203 Wireless Session Protocol, which involves a respective binary code in the form of an 8-bit value or an octet being stipulated for the defined header field names and header field values. These values can be used to code and decode the headers. The binary coding is used between the MMS connection unit under the MMS user application or MMS Client; i.e., it is used on the air interface in a mobile radio system, for example. In addition, mechanisms for textual coding of further header fields are also specified which are compatible with Internet e-mail based on RFC822.

The 3rd Generation Partnership Project 3GPP prescribes the textual coding for the messages in the MIME format in Technical Specification 23.140 v4.3.0, Rel-4: Multimedia Messaging Service; Functional Description; Stage 2 for presenting multimedia messages which are exchanged between MMS connection units or MMS Proxy/Relay stations in the network. This prescription is set out in RFC 2045-RFC 2049 as an extension of RFC822.

Communication between the units is possible without problems only if all the devices involved in transmitting the multimedia message (i.e., all the MMS connection units and MMS user applications involved), implement the same version. If different versions of the specification are implemented, however, the result may be, by way of example, that a unit receives a message with an unknown binary code. If the received message is intended to be converted into the textual form, then problems arise, since the textual coding of the binary code is not known. In such a case, it is not possible to convert the binary code. The receiving unit then merely has the options of ignoring the unknown code or of not performing the transformation and instead responding to the sending unit with an error message. It is not possible to forward the message in textual form including the data part's information represented with binary codes.

The present invention is, therefore, directed toward a method for mobile transmission of multimedia data, a computer program product and a communication system in which it is also possible to process unknown codes without any system-related transmission problems and, in particular, with forward compatibility.

SUMMARY OF THE INVENTION

A method based on the present invention is distinguished in that data are converted in a network unit between a binary representation and a textual representation of information by virtue of elements of the data which contain an unknown codeword being transmitted with the unknown codeword in marked form. The marking is made in a sender-end MMS Proxy/Relay and protects an unknown codeword against misinterpretation by the receiver-end MMS Proxy/Relay, particularly against interpretation as transmission error.

A marked unknown codeword is advantageously transmitted in unaltered form. An unknown codeword may include, as data, a header field for multimedia data which is recoded in line with the present invention. In this case, a header field for a multimedia message includes a field name and a field value. For the purpose of transmission and inventive coding of an unknown field value, one development of the present invention involves a keyword being inserted into a textual form. The resultant code then contains the unknown binary code as an additional parameter. When an unknown name for a header field is coded into a textual form, on the other hand, a keyword is advantageously used as a new header field name. It is thus, a relatively simple matter to securely code and transmit an unknown header field name and an associated, likewise unknown field value, with the recoding being performed in a manner compatible with a MIME format, in particular.

In one embodiment of the present invention, the coding of a field value into a textual form involves the use of the text "UnknownBinaryValue" as keyword. To suit the structure thereof, the coding of a name for a header field into a textual form preferably involves the use of text "X-Mms-Unknown-HeaderFieldName" as keyword.

It is therefore a simple matter to set up and/or extend a communication system in line with today's standards in which the network units are designed for implementing a method having one or more of the preceding features. In this case, a method extended in line with the present invention can be sold very quickly and economically in the form of a computer program product. The computer program product includes, in particular, a computer-readable storage medium on which a corresponding program is stored. Once loaded into a memory, the program, in turn, allows a data processing installation to prompt recoding of the type described above for the data which are to be transmitted in a connected communication system and, in particular, a mobile radio network.

The present invention thus solves the problem, on the whole, via compatible coding of the binary codes which are unknown in a network unit in the textual header fields of the MIME format. The structure of this solution is compatible with the applied standards and necessitates satisfactorily little complexity.

The coding is performed on the basis of the mechanisms described below with regard to exemplary embodiments of the present invention. A key factor in this regard is that the coding mechanisms of WAP MMS also allow unknown, binary-coded header field types to be extracted from a message. The field name is coded with an octet; i.e., an 8-bit value. The field value is coded either with a single octet or with a text, which must end with the octet "00", or with another type, which then needs to start with a length statement. This ensures that any field can be broken down into its name and its value without the need for the decoder to know the type of field or the structure of the value. The text below thus uses exemplary embodiments to present structure-compatible recoding of the header fields for the purpose of embedding the still binary data bodies into an IP network.

Additional features and advantages of the present invention will be described in, and will be apparent from, the following Detailed Description of the Invention and the Figures.

BRIEF DESCRIPTION OF THE FIGURES

FIG. 1 shows a simplified block diagram for implementation of a transmission of multimedia data from a mobile center A to a mobile receiver B.

DETAILED DESCRIPTION OF THE INVENTION

FIG. 1 shows a WAP MMS Transaction Flow diagram in the form of a schematic depiction of data transmission with associated transmissions based on the Wireless Application Protocol or WAP standard between various levels. The communication system 1 taken as a basis below includes at least three levels, namely, level 2 as the level for a sender of the data or MM, a provider level 3 and level 4 for a receiver which receives the MM in conditioned form on a subscriber terminal 5 or a telecommunication unit referred to as MMS Client. In this case the provider level 3 has been split into two levels so as to be able to distinguish between an MMS Proxy/Relay A responsible for the sender A and an MMS Proxy/Relay B responsible for the receiver B. These two MMS Proxy/Relays are connected to one another via an IP network in accordance with an Internet protocol, in which the header fields are recoded from binary coding into textual coding purely for the purpose of transmitting the MM and the illustrated return data, which is highly significant to the subject matter of the present invention and is subsequently explained in detail.

In the exemplary embodiment, the application of the present invention to a communication system 1 for the WAP standard is described, as will be used in the transmission of multimedia data in the Universal Mobile Telecommunication System UMTS. It goes without saying that the present invention also can be transferred to other standards. In particular, this also includes hybrid communication systems which, besides mobile radio links, also include landline network connections or the like.

As already described at the outset, the UMTS standard has provision to provide a "Multimedia Messaging Service" MMS for transmitting complex messages, the multimedia messages MMs, in addition to the previous Short Message Service SMS. As such, it is also possible to transmit formatted texts and pictures with and without sound. The limitation to a message length of 160 characters which exists in the SMS is no longer present. It is possible to transmit, inter alia, audio and video messages which include a number of parts and/or are coupled to one another. MMS can be implemented by using WAP.

The communication system 1 include level 2 of the data sender, also called MMS Client A. There is also level 3 for a provider, whose network element performs the service and is subsequently referred to as sender-end MMS connection unit or MMS Proxy/Relay A. Finally, level 4 is provided as the level for the receiver B, which is called MMS Client B. It is naturally possible for level 3 to contain a number of providers as well. This is possible, by way of example, as a result of the data sender A and the dialed receiver B using different providers. In addition, these different providers also can be connected to one another by third providers as network operators of the IP network.

The illustration in FIG. 1 shows exchange of the WAP messages between four entities which are involved, MMS Client A, MMS Proxy/Relay A, MMS Proxy/Relay B and MMS Client B, when an MM is sent or received. MMS Client is understood to be an application on a subscriber terminal which implements the MMS functionality. An MMS Proxy/Relay is a network element at an MMS Service Provider which makes the MMS functionality available to the MMS Clients. The data sender's level 2 includes at least one subscriber terminal or telecommunication unit 5, and the receiver's level 4 likewise includes a subscriber terminal or telecommunication unit 6. These telecommunication units 5,6 can be in the form of, by way of example, ordinary mobile phones or in the form of units with further input or display functions, such as laptops.

The sequence of individual signals in the communication system 1 described above will now be explained, the sequence being necessary to send an MM from the MMS Client A via the MMS Proxy/Relay A and MMS Proxy/Relay B to the MMS Client B in PULL mode:

A multimedia message MM which has been written in the sender's telecommunication unit 5, or needs to be forwarded using the telecommunication unit, may contain one or more elements or data records; for example, individual pictures, film sequences, texts or the like. The MM is initially sent as a request transmission, which has the name M-send.req in the WAP protocol, from level 2 to the provider MMS Proxy/Relay A in level 3. From there, the received transmission is acknowledged to the sender in level 2 using a return transmission M-send.conf.

An IP network is used to send the message MM from MMS Proxy/Relay A to MMS Proxy/Relay B, with the message MM also being recoded. In this exemplary embodiment, the IP network uses the Simple Mail Transfer Protocol SMTP, which requires e-mail-like data organization or presupposes textual coding of the header fields. This presupposition also applies to all messages and notifications arising in the course of the MM transmission, even if they should be WAP internal only.

The MMS service provider for receiver B generally has knowledge about what types of media (e.g., still picture), and what media formats (e.g., JPEG) the MMS Client B belonging to receiver B can process or display. Such information is exchanged while an MMS Client B is registering with the MMS service provider which is responsible, and is stored in the latter's area of responsibility, the Multimedia Messaging Service Environment MMSE. If an MMS service provider receives an MM including an element from a media type or media format which the addressed MMS Client B is not able to process and/or reproduce, a file type or file format can be transcoded or converted prior to delivery of the MM in the MMSE of the MMS service provider associated with receiver B. At a subsequent time, the provider MMS Proxy/Relay B sends information M-Notification.ind to the receiver MMS Client B in level 4, which informs the latter that there is a message available for it with the provider MMS Proxy/Relay B for download.

As a result, the provider MMS Proxy/Relay B in this case automatically receives an acknowledging response M-NotifyResp.req from the telecommunication unit 6 belonging to the receiver B, returned from level 4 to level 3. Only upon request by the receiver B using a transmission WSP-GET does the provider MMS Proxy/Relay B forward the MM to the receiver MMS Client B using a transmission M-Retrieve.conf. A message M-Acknowledge.ind acknowledges receipt of the MM in level 4. A final message M-Delivery.ind returns an acknowledgement of receipt from level 3 to the sender MMS Client A in level 2.

The aforementioned transmissions are managed using "header fields"; that is to say, fields which precede the individual elements of the MM and can contain information about the origin, transmission time, file format, file size and further details, which do not all have to be known or may not all be known to the MMS Proxy/Relays, because they have been newly introduced. So that they are not treated as transmission errors or other errors and, consequently are not transmitted or not transmitted correctly, the present invention provides various measures which will now be presented and discussed using two exemplary embodiments.

1. Coding of Unknown Header Field Values

The present invention provides for unknown header field values to be coded in textual form by inserting a keyword as a header field value, the keyword containing the unknown binary code as an additional parameter. The example used is the header field X-Mms-Status: Forwarded which would be able to be presented in binary WAP coding, for example in hexadecimal representation, as 95 85. In this case, 95 is the hexadecimal value for the known field name and 85 is the value for the status value "forwarded," which is not yet included in version 1.0 of the WAP MMS Message Encapsulation. If this header field is now received in binary form by a network unit, (i.e., the hexadecimal code 95 85arrives), the receiving unit cannot convert the value 85 into the corresponding text, because this is not known.

Textual coding of this information now can be performed in line with the present invention as follows:

X-Mms-Status: UnknownBinaryValue=85

The keyword "UnknownBinaryValue" announces the unknown binary value, which then follows the equals sign. The coding according to the present scheme also can be performed by a unit which does not know the status value 85; namely, in this example, the word "Forwarded." From the textual representation proposed here, a subsequent unit is able to perform reconversion to the binary representation without difficulty. It is merely necessary to comply with the syntax of the binary coding and to use the value 85. It also is, therefore, possible to use MMS network connection units or MMS Proxy/Relay stations for transporting the binary codes which are unknown to them.

2. Coding of Unknown Header Field Names and Header Field Values

In line with the present invention, unknown header field names and values are coded in textual form by using a keyword as new header field name. Since unknown header fields also may contain unknown header field values, these are also coded, as described above, by a keyword which is followed by the unknown binary code as an additional parameter. The example used is the header field X-Mms-UnknownHeaderFieldName: Unknown-Value In binary WAP coding, this field could be represented in hexadecimal form; for example, using the values C0 80. In this case, C0 is the hexadecimal value for the unknown field name "X-Mms-UnknownHeaderFieldName" and 80 is the value for the value "Unknown-Value" which is not yet contained in version 1.0 of the WAP MMS Message Encapsulation specification.

Following receipt of the hexadecimal codes C0 80, a unit of this header field can be displayed in textual coding, in line with the present invention, as follows:

X-Mms-UnknownBinaryFieldName: C0; UnknownBinaryValue=80

The keyword "X-Mms-UnknownBinaryFieldName" announces the unknown header field name, which then follows in text form as the value "C0." The unknown binary field value is then signalled as a parameter in the same header field with the keyword "UnknownBinaryValue." This is followed by an equals sign and the binary value itself; in this example, the textually represented value 0x80. The coding in accordance with the proposed scheme also can be performed by a unit which does not know the binary value for the field name 0xC0 or the field value 0x80. Conversion back to the binary representation can be performed without difficulty. It also is, therefore, possible to use MMS network connection units for transporting the binary codes which are unknown to them.

The following further example is intended to illustrate the universal suitability of the new coding based on the present invention.

As with the previous example, with the present example has the basis of an unknown field name and an unknown field value in accordance with the following scheme:

X Mms-UnknownHeaderFieldName: Unknown-Value

This time, the field name has been coded by the binary code D1, and the field value is a (e.g., "Text"), which, coded in binary form, has the following hexadecimal representation: 54 65 78 74 00. This is the hexadecimal representation of the ASCII values for the letters. The final zero, "00" in hexadecimal representation, is the end of the character string and thus signals the end of the field value. In line with the present invention, this header field is represented by the following text field:

X-Mms-UnknownBinaryFieldName: D1; UnknownBinaryValue=54 65 78 74 00

The keyword "X-Mms-UnknownBinaryFieldName" announces the unknown header field name, which then follows in text form as a value "D1." The unknown binary field value is then signalled as a parameter in the same header field with the keyword "UnknownBinaryValue". This is followed by an equals sign and the binary value itself; in this example, the textually represented hexadecimal values of the ASCII characters 54 65 78 74 00, including the final zero. When this header field is received, it can be converted back to the original binary-coded header field without difficulty.

Although the present invention has been described with reference to specific embodiments, those of skill in the art will recognize that changes may be made thereto without departing from the spirit and scope of the present invention as set forth in the hereafter appended claims.

The invention claimed is:

1. A method for transmitting a multimedia message to a mobile subscriber terminal, the method comprising the steps of:
    transmitting the multimedia message from an MMS application to a first network unit associated with the MMS application, the multimedia message including a multimedia element and a header field;
    transmitting the multimedia message to a second network unit associated with a receiver;
    transforming the header field into a textual encoding at the first network unit prior to transmitting the multimedia message to the second network unit
    transmitting the multimedia message from the second network unit to the receiver;
    inserting a textually-encoded keyword into the header field as a marking for an unknown binary codeword; including the unknown binary codeword in an unmodified manner as an additional parameter of the keyword.

2. A method for transmitting a multimedia message to a mobile subscriber terminal as claimed in claim 1, wherein the unknown binary codeword is a field value of the header field, the field value being included as an additional parameter of the keyword.

3. A method for transmitting multimedia data to a mobile subscriber terminal as claimed in claim 2, wherein the keyword is one of the text UnknownBinaryValue and the text UnknownValue.

4. A method for transmitting a multimedia data to a mobile subscriber terminal as claimed in claim 1, wherein the textual encoding is performed in a manner compatible with a MIME format.

5. A communication system for transmitting a multimedia message to a mobile subscriber terminal, comprising:
    an MMS application;
    a first network unit associated with the MMS application, wherein the multimedia message includes a multimedia element and a header field, and the multimedia message is transmitted from the MMS application to the first network unit;
    a second network unit, wherein the multimedia message is transmitted from the first network unit to the second network unit, wherein the header field is transformed into a textual encoding at the first network unit prior to transmitting the multimedia message to the second network unit;
    a receiver to which the second network unit is associated, wherein the multimedia message is transmitted from the second network unit to the receiver;
    wherein a textually-encoded keyword is inserted into the header field as a marking for an unknown binary codeword, the unknown binary codeword being included in an unmodified manner as an additional parameter of the keyword.

6. A communication system as claimed in claim 5, wherein the unknown binary codeword is a field value of the header field, the field value being included as an additional parameter of the keyword.

7. A communication system as claimed in claim 6, wherein the keyword is one of the text UnknownBinaryValue and the text UnknownValue.

8. A communication system as claimed in claim 5, wherein the textual encoding is performed in a manner compatible with a MIME format.

9. A computer program product to assist in transmitting a multimedia message to a mobile subscriber terminal, wherein the multimedia message is transmitted from an MMS application to a first network unit associated with the MMS application, the multimedia message including a multimedia element and a header field, the multimedia message is transmitted to a second network unit associated with a receiver, the header field is transformed into a textual encoding at the first network unit prior to transmitting the multimedia message to the second network unit, the multimedia message is transmitted from the second network unit to the receiver, a textually-encoded keyword is inserted into the header field as a marking for an unknown binary codeword, and the unknown binary codeword is included in an unmodified manner as an additional parameter of the keyword.

* * * * *